(12) United States Patent
Maeda

(10) Patent No.: US 10,219,023 B2
(45) Date of Patent: Feb. 26, 2019

(54) SEMICONDUCTOR DEVICE, VIDEO DISPLAY SYSTEM, AND METHOD OF OUTPUTTING VIDEO SIGNAL

(71) Applicant: LAPIS SEMICONDUCTOR CO., LTD., Kanagawa (JP)

(72) Inventor: Shusaku Maeda, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 106 days.

(21) Appl. No.: 15/332,121

(22) Filed: Oct. 24, 2016

(65) Prior Publication Data

US 2017/0127116 A1 May 4, 2017

(30) Foreign Application Priority Data

Oct. 28, 2015 (JP) .................................. 2015-212066

(51) Int. Cl.
*H04N 21/43* (2011.01)
*G09G 3/36* (2006.01)
(Continued)

(52) U.S. Cl.
CPC ........... *H04N 21/4302* (2013.01); *G09G 3/36* (2013.01); *H04N 21/4307* (2013.01); *G09G 5/12* (2013.01);
(Continued)

(58) Field of Classification Search
CPC ....... G09G 2340/04; G09G 2340/0407; G09G 5/005; G09G 5/006; G09G 5/18; G09G 5/00; G09G 3/36; G09G 2320/02; G09G 2310/08; G09G 5/003; G09G 5/12; G09G 5/227; G09G 2320/10; G09G 2320/103; G09G 2340/0414; G09G 2340/0421; G09G 2340/0428; G09G 2340/0435; G09G 2340/0442; G09G 2340/045; G09G 2360/06; G09G 2360/08; G09G 2360/10; G09G 2370/20; G06F 13/00; G06F 13/18; G06F 3/14; G06F 3/1423; G06F 3/1446;
(Continued)

(56) References Cited

U.S. PATENT DOCUMENTS 5,900,917 A * 5/1999 Yanai .................... G06T 1/20
348/563
2004/0012724 A1* 1/2004 Jang .................... G09G 3/20
348/739
(Continued)

FOREIGN PATENT DOCUMENTS

JP 2008-099254 A 4/2008
JP 2013-007907 A 1/2013
WO WO-2012029228 A1 * 3/2012 ............... G09G 5/12

*Primary Examiner* — Darlene M Ritchie
(74) *Attorney, Agent, or Firm* — Kubotera & Associates, LLC

(57) ABSTRACT

A semiconductor device includes a first selecting portion and a selection signal generating portion. The first selecting portion is configured to select one of a plurality of video signals input thereto according to a first selection signal. Further, the first selecting portion is configured to output the one of the video signals thus selected in synchronization with a synchronization signal accompanied with the one of the video signals thus selected. The selection signal generating portion is configured to generate the first selection signal.

12 Claims, 9 Drawing Sheets

(51) Int. Cl.
*G09G 5/12* (2006.01)
*H04N 21/44* (2011.01)

(52) U.S. Cl.
CPC ..... *G09G 2310/08* (2013.01); *G09G 2320/02* (2013.01); *G09G 2340/04* (2013.01); *G09G 2340/0442* (2013.01); *G09G 2360/06* (2013.01); *G09G 2370/08* (2013.01); *G09G 2370/20* (2013.01); *H04N 21/44004* (2013.01)

(58) Field of Classification Search
CPC .... G06F 3/1431; G06F 3/1407; G06F 3/1415; H04N 21/4307; H04N 21/4302; H04N 21/44; H04N 21/44004
USPC ....... 345/8, 20, 27, 156–214, 520–699, 502; 315/169.2; 348/563; 715/746, 736
See application file for complete search history.

(56) References Cited

U.S. PATENT DOCUMENTS

| | | | | |
|---|---|---|---|---|
| 2004/0189872 | A1* | 9/2004 | Amendolagine | H04N 9/74 348/578 |
| 2005/0068288 | A1* | 3/2005 | Jang | G09G 3/2092 345/100 |
| 2008/0007549 | A1* | 1/2008 | Huang | G06F 3/14 345/213 |
| 2008/0309474 | A1* | 12/2008 | Okamoto | B60K 35/00 340/462 |
| 2010/0253836 | A1* | 10/2010 | Huang | G09G 5/391 348/441 |
| 2012/0327235 | A1 | 12/2012 | Wada et al. | |
| 2016/0031370 | A1* | 2/2016 | McElroy | B60R 1/00 348/148 |

\* cited by examiner

SEMICONDUCTOR DEVICE, VIDEO DISPLAY SYSTEM, AND METHOD OF OUTPUTTING VIDEO SIGNAL

BACKGROUND OF THE INVENTION AND RELATED ART STATEMENT

The present invention relates to a semiconductor device. The present invention also relates to a video display system having the semiconductor device and a method of outputting a video signal.

Patent Reference 1 has disclosed a conventional video display system for selecting and displaying a video among a plurality of videos. According to Patent Reference 1, when the conventional video display system is instructed to switch a video signal to a television video signal while the conventional video display system displays a navigation video, the navigation video is first switched to a pink image. As a result, a color determining portion of the conventional video display system generates a chroma key signal. Accordingly, the conventional video display system switches the video signal to the television video signal.

Patent Reference 1: Japanese Patent Publication No. 2008-99254

Patent Reference 2 has disclosed another conventional video display system. According to Patent Reference 2, when the conventional video display system is started, a display controller performs setting according to setting data stored in a memory, so that a selector selects a video signal directly supplied from a backup camera. Then, the conventional video display system converts a resolution of the video signal and supplies the video signal to an LCD (Liquid Crystal Display) panel. After a system controller is started, the selector selects the video signal supplied from the system controller, so that the video signal is supplied to the LCD panel.

Patent Reference 2: Japanese Patent Publication No. 2013-7907

As described above, in order for the conventional video display system to select and display one of a plurality of videos, the selector is provided for selecting and outputting the video signal from a plurality of video signals input thereto. More specifically, the selector of the conventional video display system is configured to perform such a simple operation as instantly switching the video signal from a plurality of video signals input externally. Accordingly, the selector of the conventional video display system is configured to output the video signal selected not in synchronization with a vertical synchronization signal.

In the conventional video display systems described above, when the video signal selected with the selector while not being in synchronization with the vertical synchronization signal is input into the LCD panel, the video to be displayed tends to be distorted until the video signal is synchronized with the vertical synchronization signal after the video signal is switched. In order to prevent the video to be displayed from being distorted, the conventional video display systems may be configured to perform video muting. However, if the conventional video display systems perform the video muting every time the video is switched, a work load of the conventional video display systems tends to increase.

In view of the problems of the conventional video display system described above, an object of the present invention is to provide a semiconductor device, a video display system, and a method of outputting a video signal capable of preventing a video to be displayed from being distorted when the video is switched.

Further objects and advantages of the invention will be apparent from the following description of the invention.

SUMMARY OF THE INVENTION

In order to attain the objects described above, according to a first aspect of the present invention, a semiconductor device includes a first selecting portion and a selection signal generating portion. The first selecting portion is configured to select one of a plurality of video signals input thereto according to a first selection signal. Further, the first selecting portion is configured to output the one of the video signals thus selected in synchronization with a synchronization signal accompanied with the one of the video signals thus selected. The selection signal generating portion is configured to generate the first selection signal.

According to a second aspect of the present invention, a video display system includes a semiconductor device and a displaying portion. The semiconductor device includes a first selecting portion and a selection signal generating portion. The first selecting portion is configured to select one of a plurality of video signals input thereto according to a first selection signal. Further, the first selecting portion is configured to output the one of the video signals thus selected in synchronization with a synchronization signal accompanied with the one of the video signals thus selected. The selection signal generating portion is configured to generate the first selection signal. The displaying portion is configured to display a video according to the video signal selected with the first selecting portion.

According to a third aspect of the present invention, a method of outputting a video signal includes the steps of selecting one of a plurality of video signals to be input according to a first selection signal; and outputting the one of the video signals thus selected in synchronization with a synchronization signal accompanied with the one of the video signals thus selected.

According to the present invention, it is possible to provide the semiconductor device, the video display system, and the method of outputting the video signal capable of preventing a video to be displayed from being distorted when the video is switched.

DETAILED DESCRIPTION OF PREFERRED EMBODIMENTS

Figure 1:
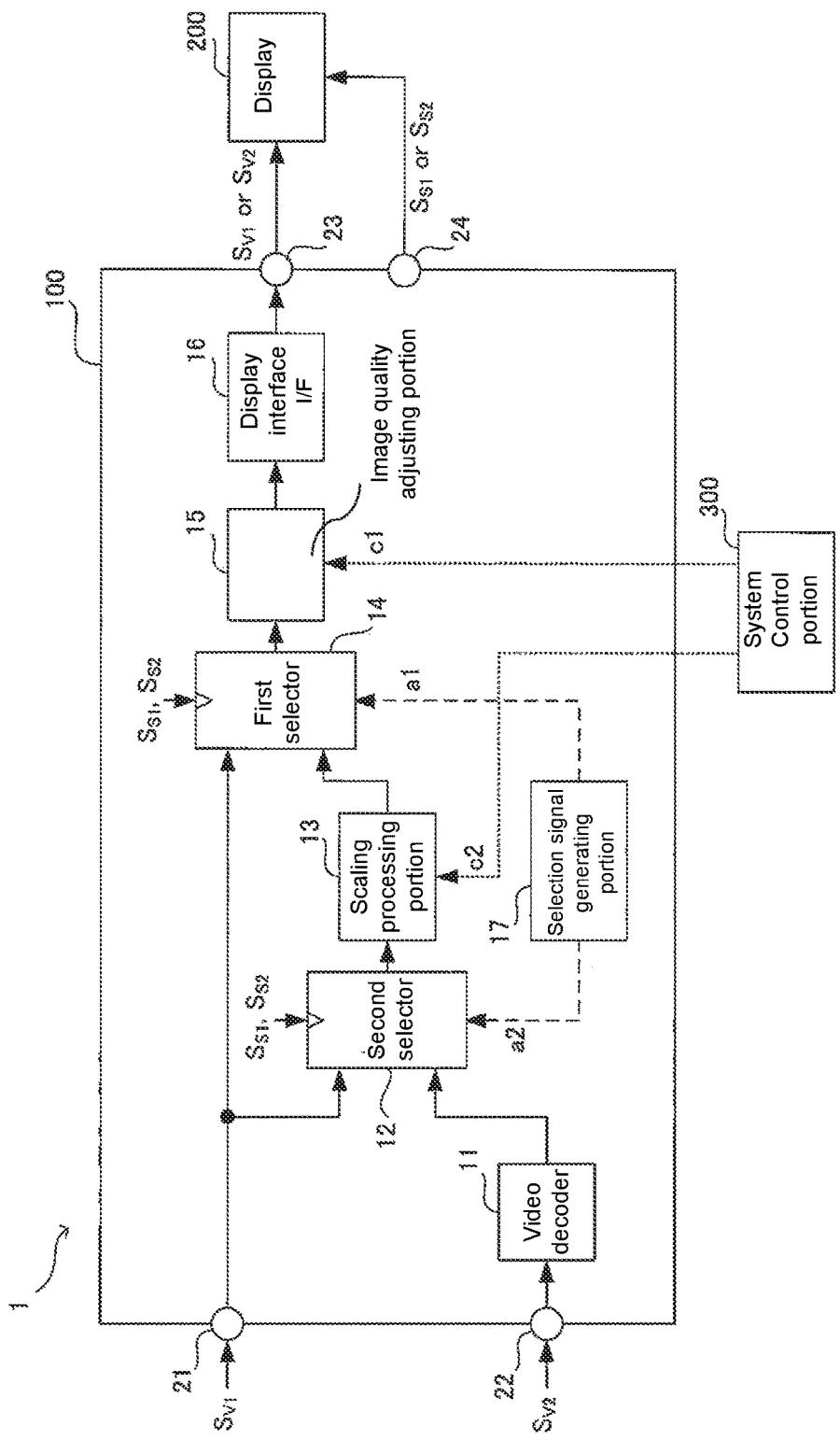
FIG. 1 is a block diagram showing a configuration of a video display system including a semiconductor device according to a first embodiment of the present invention.

Hereunder, preferred embodiments of the present invention will be explained with reference to the accompanying drawings. It should be noted that similar components or similar structural elements shown in the accompanying drawings are designated with the same reference numerals, and redundant explanations thereof are omitted.

First Embodiment

A first embodiment of the present invention will be explained. FIG. 1 is a block diagram showing a configuration of a video display system 1 including a semiconductor device 100 according to the first embodiment of the present invention.

As shown in FIG. 1, the video display system 1 includes the semiconductor device 100, a display 200, and a system control portion 300. The semiconductor device 100 is configured as a display controller that selects a video to be displayed on the display 200, performs a scaling process, performs an image quality adjustment, and the like under the control of the system control portion 300.

In the first embodiment, the semiconductor device 100 is configured to include a video decoder 11, a scaling processing portion 13, an image quality adjusting portion 15, a display interface 16, a selection signal generating portion 17, a first selector 14, a second selector 12, video input terminals 21 and 22, a video output terminal 23, and a synchronization signal output terminal 24.

In the first embodiment, a video signal is input into the video input terminal 21 and the video input terminal 22 from an outside of the semiconductor device 100. More specifically, a first video signal SV1 as a digital video signal is input into the video input terminal 21, and a second video signal SV2 as an analog video signal is input into the video input terminal 22. Further, a first vertical synchronization signal SS1 accompanied with the first video signal SV1 and a second vertical synchronization signal SS2 accompanied with the second video signal SV2 are input into the semiconductor device 100.

In the first embodiment, when the video display system 1 is mounted on, for example, a car navigation system, the first video signal SV1 may include a navigation video containing a map video, and the second video signal SV2 may include a video captured with a camera constituting a back monitor.

In the first embodiment, the video decoder 11 is configured to convert the second video signal SV2 as the analog video signal to a digital signal. It should be noted that when the second video signal SV2 is a composite video signal that combines a video signal and a synchronization signal, the video decoder 11 separates the video signal and the synchronization signal.

In the first embodiment, the second selector 12 receives the first video signal SV1, the first vertical synchronization signal SS1, the second video signal SV2 converted to the digital signal with the video decoder 11, and the second vertical synchronization signal SS2. Further, a second selection signal a2 generated with the selection signal generating portion 17 and containing a selection instruction of the video signal is input into the second selector 12. The second selector 12 is configured to select one of the first video signal SV1 and the second video signal SV2 converted to the digital signal according to the second selection signal a2. Further, the second selector 12 is configured to output the selected video signal in synchronization with the vertical synchronization signal accompanied with the selected video signal. For example, when the second selector 12 selects the first video signal SV1 according to the second selection signal a2, the second selector 12 outputs the first video signal SV1 in synchronization with the first vertical synchronization signal SS1 accompanied with the first video signal SV1.

In the first embodiment, the scaling processing portion 13 is configured to perform the scaling process on the video signal output from the second selector 12, so that a size of the video according to the video signal is matched to a size of the display 200.

Figure 2:
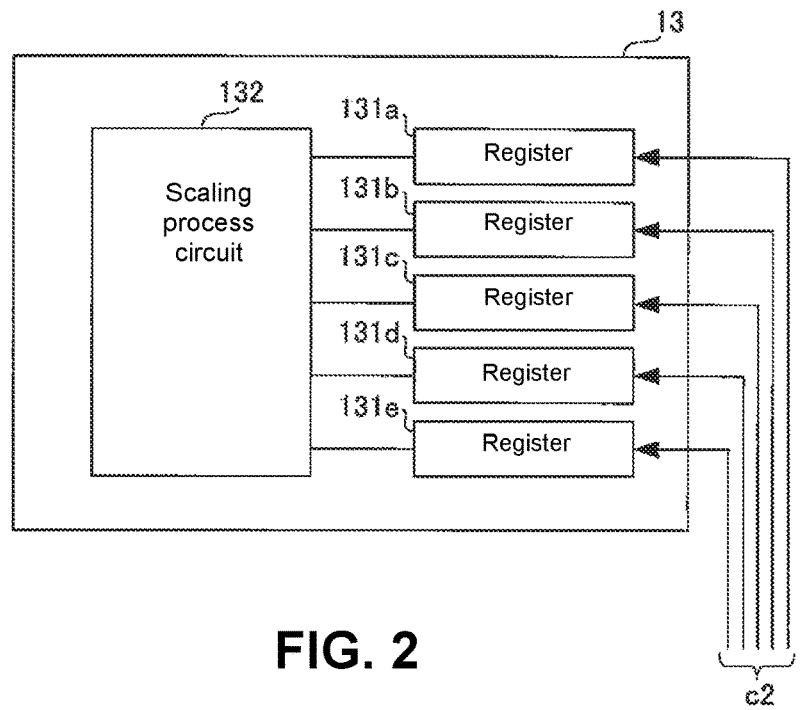
FIG. 2 is a block diagram showing a configuration of a scaling processing portion of the semiconductor device according to the first embodiment of the present invention.

FIG. 2 is a block diagram showing a configuration of the scaling processing portion 13 of the semiconductor device 100 according to the first embodiment of the present invention.

As shown in FIG. 2, the scaling processing portion 13 includes a scaling process circuit 132 and a plurality of registers 131a to 131e. The scaling process circuit 132 is configured to perform the scaling process on the video signal input thereto according to setting values c2 stored in the registers 131a to 131e. The registers 131a to 131e are storing portions configured to store the setting values c2 for the scaling process to be rewritable. It should be noted that the setting values c2 to be stored in the registers 131a to 131e are supplied from the system control portion 300 that is disposed the outside of the semiconductor device 100.

In the first embodiment, when the video signal output from the semiconductor device 100 (referred to as an output video signal) is switched, the setting values c2 to be stored in the registers 131a to 131e of the scaling processing portion 13 are rewritten, so that the setting values c2 for the scaling process performed with the scaling processing portion 13 are changed. For example, when the output video signal is switched from the second video signal SV2 to the first video signal SV1, the setting values c2 to be stored in the registers 131a to 131e of the scaling processing portion 13 are rewritten from the setting values c2 corresponding to the second video signal SV2 to be switched to the setting values c2 corresponding to the first video signal SV1 to be the output video signal after the switching.

In the first embodiment, the first selector 14 is configured to receive the first video signal SV1 without the scaling process being performed thereon, the first video signal SV1 or the second video signal SV2 with the scaling process being performed thereon with the scaling processing portion 13, the first vertical synchronization signal SS1, and the second vertical synchronization signal SS2. Further, a first selection signal a1 generated with the selection signal generating portion 17 and containing the selection instruction of the video signal is input into the first selector 14. The first selector 14 is configured to select one of the videos signals input thereto according to the first selection signal a1. Further, the first selector 14 is configured to output the selected video signal in synchronization with the vertical synchronization signal accompanied with the selected video signal. For example, when the first selector 14 selects the first video signal SV1 without the scaling process being performed thereon according to the first selection signal a1, the first selector 14 outputs the first video signal SV1 in synchronization with the first vertical synchronization signal SS1 accompanied with the first video signal SV1.

In the first embodiment, the image quality adjusting portion 15 is configured to perform the image quality adjustment such as contrast adjustment, off-set adjustment, gamma correction, and the like relative to the video signal output from the first selector 14.

Figure 3:
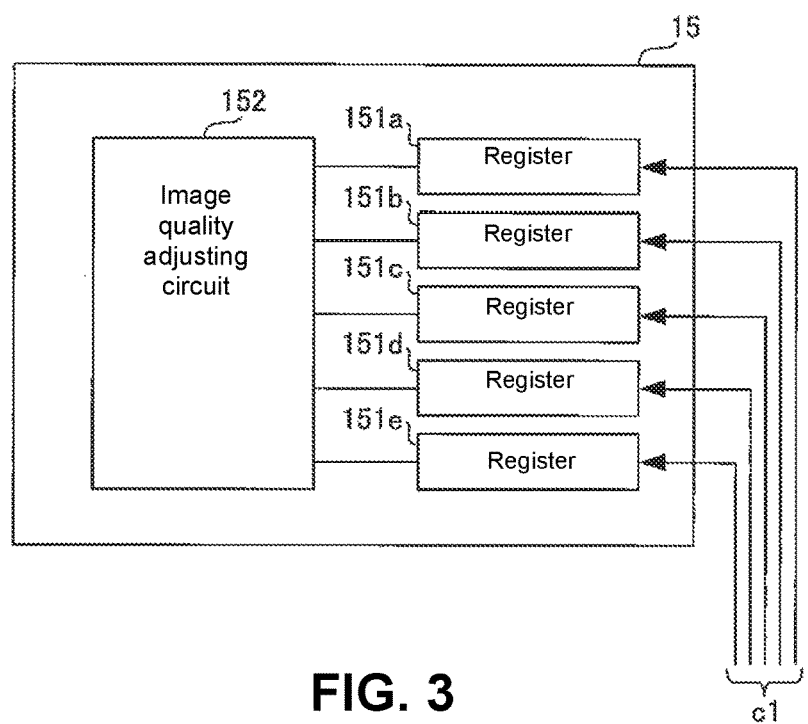
FIG. 3 is a block diagram showing a configuration of an image quality adjusting portion of the semiconductor device according to the first embodiment of the present invention.

FIG. 3 is a block diagram showing a configuration of the image quality adjusting portion 15 of the semiconductor device 100 according to the first embodiment of the present invention.

As shown in FIG. 3, the image quality adjusting portion 15 includes an image quality adjusting circuit 152 and a plurality of registers 151a to 151e. The image quality adjusting circuit 152 is configured to perform the image quality adjustment on the video signal input thereto according to setting values c1 stored in the registers 151a to 151e. The registers 151a to 151e are storing portions configured to store the setting values c1 for the image quality adjustment to be rewritable. More specifically, registers 151a to 151e are configured to store the setting values c1 for each of the image quality adjustment such as the contrast adjustment, the off-set adjustment, the gamma correction, and the like. It should be noted that the setting values c1 to be stored in the registers 151a to 151e are supplied from the system control portion 300 that is disposed the outside of the semiconductor device 100.

In the first embodiment, in the semiconductor device 100, when the output video signal is switched, the setting values c1 to be stored in the registers 151a to 151e of the image quality adjusting portion 15 are rewritten, so that the setting values c1 for the image quality adjustment performed with the image quality adjusting portion 15 are changed. For example, when the output video signal is switched from the second video signal SV2 to the first video signal SV1, the setting values c1 to be stored in the registers 151a to 151e of the image quality adjusting portion 15 are rewritten from the setting values c1 corresponding to the second video signal SV2 to be switched to the setting values c1 corresponding to the first video signal SV1 to be the output video signal after the switching.

In the first embodiment, the display interface 16 is configured to output the video signal in a format compatible with the display 200 after the image quality adjusting portion 15 performs the image quality adjustment on the video signal. After the display interface 16 outputs the video signal, the video signal is output from the video output terminal 23 to the outside of the semiconductor device 100, so that the video signal is supplied to the display 200. Further, the vertical synchronization signal accompanied with the video signal output from the video output terminal 23 is output from the video output terminal 23 to the outside of the semiconductor device 100, so that the vertical synchronization signal is also supplied to the display 200.

In the first embodiment, the selection signal generating portion 17 is configured to generate the first selection signal a1 and the second selection signal a2 containing the selection instructions of the video signals to be selected with the first selector 14 and the second selector 12, respectively.

For example, when the video is to be displayed on the display 200 according to the first video signal SV1, and the size of the video according to the first video signal SV1 is matched to the size of the display 200, the selection signal generating portion 17 generates the first selection signal a1, so that the first video signal SV1 input directly into the first selector 14 is selected. On the other hand, when the video is to be displayed on the display 200 according to the first video signal SV1, and the size of the video according to the first video signal SV1 is not matched to the size of the display 200, the selection signal generating portion 17 generates the second selection signal a2, so that the second video signal SV2 input into the second selector 12 is selected. Further, the selection signal generating portion 17 generates the first selection signal a1, so that the second video signal SV2 input into the first selector 14 and with the scaling process performed thereon is selected.

Further, when the video is to be displayed on the display 200 according to the second video signal SV2, the selection signal generating portion 17 generates the second selection signal a2, so that the second video signal SV2 input into the second selector 12 is selected. Further, the selection signal generating portion 17 generates the first selection signal a1, so that the second video signal SV2 input into the first selector 14 and with the scaling process performed thereon is selected.

In the first embodiment, the selection signal generating portion 17 includes a register (not shown), so that the selection signal generating portion 17 generates the first selection signal a1 and the second selection signal a2 according to a setting value stored in the register. It should be noted that the setting value to be stored in the register is supplied from the system control portion 300 disposed at the outside of the semiconductor device 100. It should be also noted that the first selection signal a1 and the second selection signal a2 are not synchronized with the first vertical synchronization signal SS1 and the second vertical synchronization signal SS2.

Figure 4:
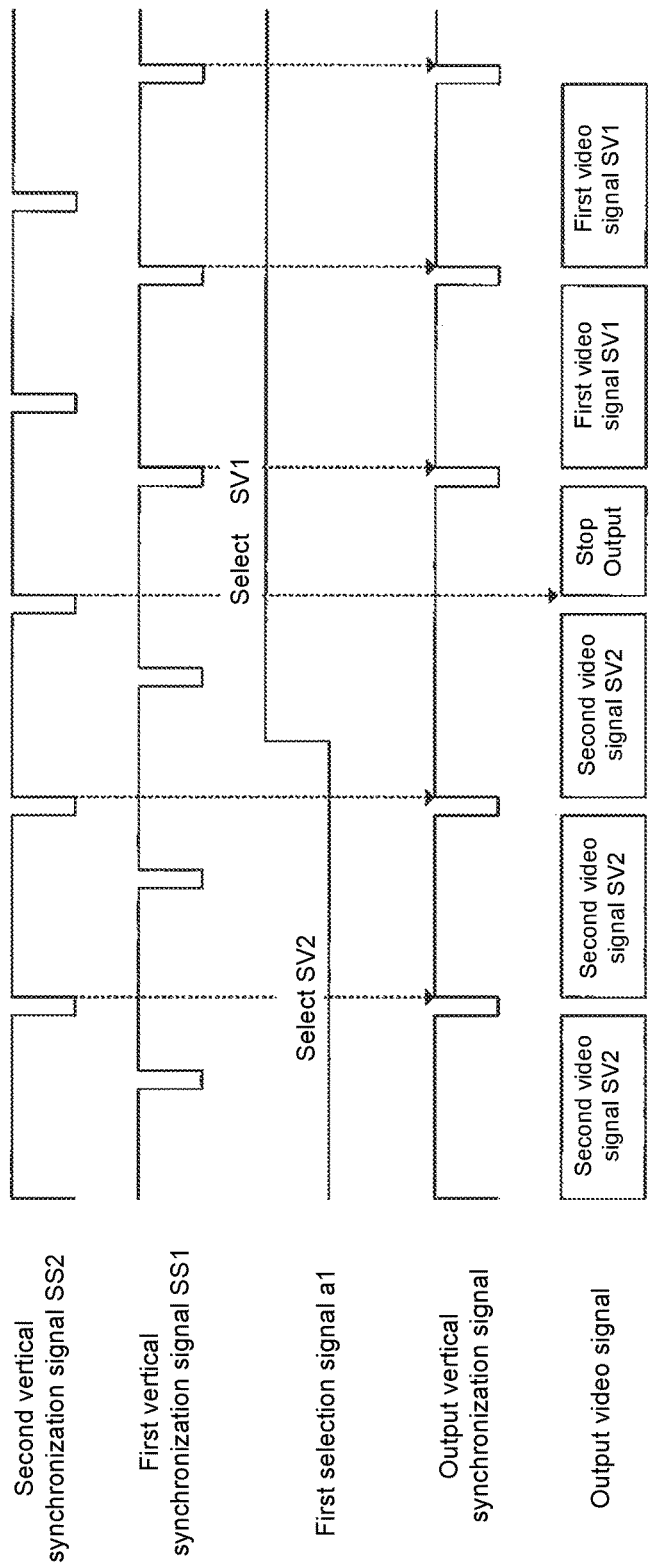
FIG. 4 is a time chart showing an example of an operation of the semiconductor device according to the first embodiment of the present invention.

An operation of the semiconductor device 100 will be explained next. FIG. 4 is a time chart showing an example of an operation of the semiconductor device 100 according to the first embodiment of the present invention. FIG. 4 shows time-base transition of the first vertical synchronization signal SS1, the second vertical synchronization signal SS2, the first selection signal a1, the vertical synchronization signal output from the semiconductor device 100 (referred to as an output vertical synchronization signal), and the output video signal. More specifically, FIG. 4 shows the example of the operation of the semiconductor device 100 when the output video signal is switched from the second video signal SV2 to the first video signal SV1.

In the first embodiment, when the first selector 14 detects that a signal level of the first selection signal a1 is changed, the first selector 14 continues to output the second video signal SV2 that is the signal before the switching until a frame period of the second video signal SV2 that is the signal before the switching is terminated, which occurs immediately after the signal level of the first selection signal a1 is changed. It should be noted that it is possible to detect the timing when the frame period of the second video signal SV2 is terminated with the second vertical synchronization signal SS2. After the frame period of the second video signal SV2 is terminated, the first selector 14 outputs the first video signal SV1 that is the signal after the switching in synchronization with the first vertical synchronization signal SS1 accompanied with the first video signal SV1.

As described above, in the first embodiment, when the first selector 14 switches the video signal to be selected according to the first selection signal a1, the first selector 14 synchronizes the timing when the frame period of the second video signal SV2 that is the signal before the switching is terminated with the second vertical synchronization signal SS2 accompanied with the second video signal SV2. Further, the first selector 14 synchronizes the timing when the first selector 14 outputs the first video signal SV1 that is the signal after the switching with the first vertical synchronization signal SS1 accompanied with the first video signal SV1.

In the first embodiment, the first vertical synchronization signal SS1 is not synchronized with the second vertical synchronization signal SS2. Accordingly, when the first selector 14 operates as described above while synchronizing with the first video signal SV1 and the second video signal SV2, the timing when the first selector 14 stops outputting the second video signal SV2 that is the signal before the switching is not matched to the timing when the first selector 14 starts outputting the first video signal SV1 that is the signal after the switching. In the first embodiment, the first selector 14 stops outputting the video signal during a period of time from the timing when the first selector 14 stops outputting the second video signal SV2 that is the signal before the switching to the timing when the first selector 14 starts outputting the first video signal SV1 that is the signal after the switching.

In the first embodiment, the first video signal SV1 output from the first selector 14 is supplied to the display 200 together with the first vertical synchronization signal SS1 through the image quality adjusting portion 15 and the display interface 16.

As described above, in the first embodiment, when the first selector 14 switches the video signal to be selected according to the first selection signal a1, the first selector 14 outputs the video signal after the switching in synchronization with the vertical synchronization signal accompanied with the video signal. Accordingly, it is possible for the display 200 to synchronize through the vertical synchronization signal immediately after the switching of the video signal. As a result, it is possible to prevent the video from being distorted due to the switching of the video signal. Accordingly, in the first embodiment, when the semiconductor device 100 switches the video, it is not necessary to perform the video muting.

Further, in the first embodiment, when the first selector 14 switches the video signal to be selected according to the first selection signal a1, the first selector 14 continues to output the video signal before the switching until the frame period of the video signal before the switching is terminated. Accordingly, it is possible to display the video before the switching on the display 200 without partially missing the video before the switching.

Further, in the first embodiment, the first selector 14 stops outputting the video signal during a period of time from when the first selector 14 stops outputting the video signal before the switching to when the first selector 14 starts outputting the video signal after the switching. However, the first selector 14 stops outputting the video signal just for a short period of time. In this case, the video immediately before the first selector 14 stops outputting the video signal remains as an after image on the display 200. Accordingly, it is possible to prevent a user of the video display system 1 from recognizing an interruption of the video associated with the switching of the video signal.

In the first embodiment, the video display system 1 may be provided with a buffer memory for storing the video signal before the switching. With the buffer memory, it is possible to supply the video signal before the switching and stored in the buffer memory during a period of time from when the first selector 14 stops outputting the video signal before the switching to when the first selector 14 starts outputting the video signal after the switching. Accordingly, it is possible to prevent from the video signal from being interrupted due to the switching of the video signal.

In the first embodiment, it should be noted that a pulse of the vertical synchronization signal before the switching is generated when the first selector 14 stops outputting the video signal before the switching. The semiconductor device 100 is configured such that the pulse is not output to the outside of the semiconductor device 100. More specifically, the semiconductor device 100 is configured such that the semiconductor device 100 does not output the vertical synchronization signal at an interval shorter than a specific interval.

In the first embodiment, it should be noted that an operation of the second selector 12 is similar to that of the first selector 14. More specifically, when the second selector 12 detects that a signal level of the second selection signal a2 is changed, the second selector 12 continues to output the second video signal SV2 that is the signal before the switching until a frame period of the second video signal SV2 that is the signal before the switching is terminated, which occurs immediately after the signal level of the second selection signal a2 is changed. After the frame period of the second video signal SV2 is terminated, the first selector 14 outputs the first video signal SV1 that is the signal after the switching in synchronization with the first vertical synchronization signal SS1 accompanied with the first video signal SV1.

As described above, in the first embodiment, when the second selector 12 switches the video signal to be selected according to the second selection signal a2, the second selector 12 synchronizes the timing when the frame period of the second video signal SV2 that is the signal before the switching is terminated with the second vertical synchronization signal SS2 accompanied with the second video signal SV2. Further, the second selector 12 synchronizes the timing when the second selector 12 outputs the first video signal SV1 that is the signal after the switching with the first vertical synchronization signal SS1 accompanied with the first video signal SV1.

Figure 5:
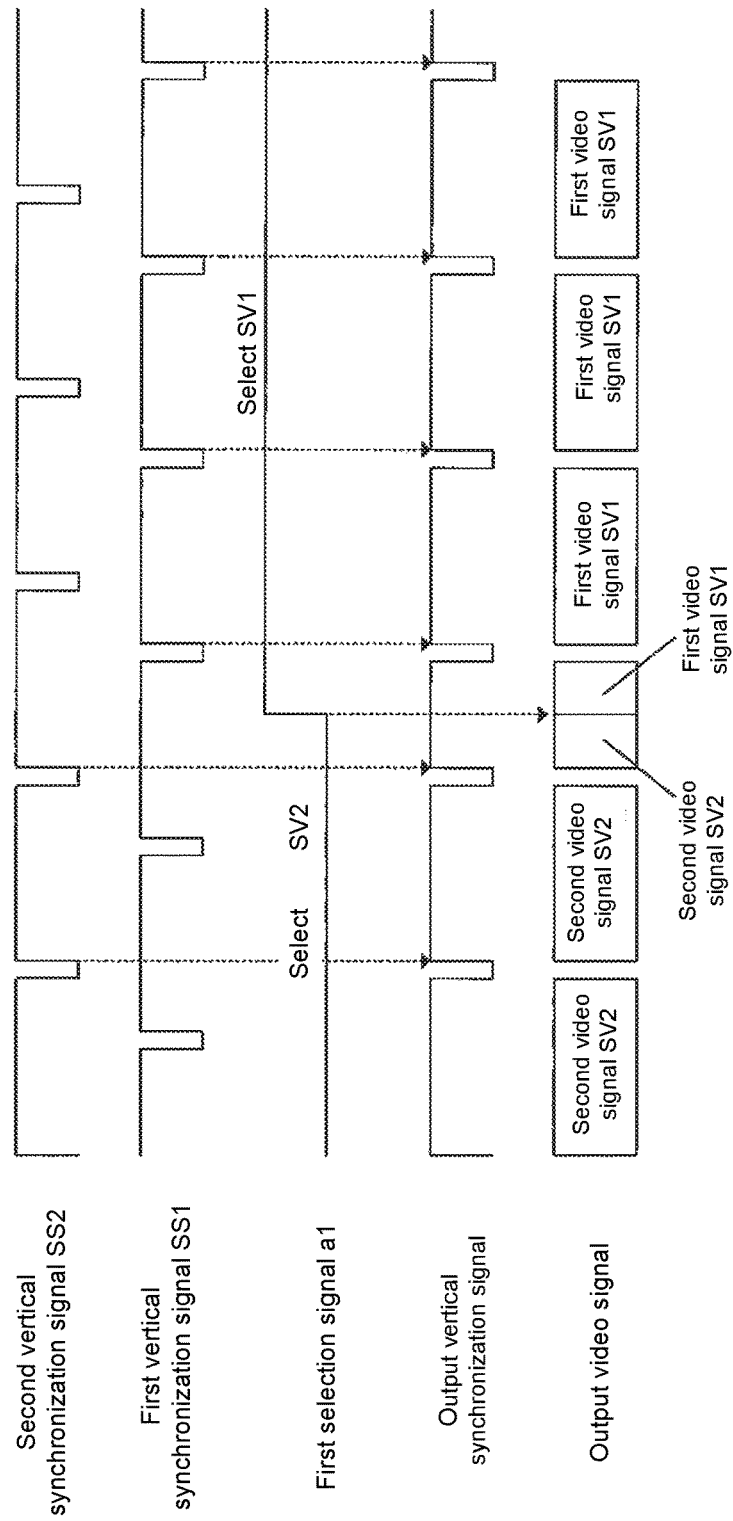
FIG. 5 is a time chart showing an example of an operation of a conventional semiconductor device.

An operation of a conventional semiconductor device will be explained next. FIG. 5 is a time chart showing an example of the operation of the conventional semiconductor device. Similar to the operation shown in FIG. 4, FIG. 5 shows the example of the operation of the conventional semiconductor device when the output video signal is switched from the second video signal SV2 to the first video signal SV1.

It should be noted that, in the conventional semiconductor device, the first selector 14 and the second selector 12 of the semiconductor device in the first embodiment are replaced with simple selectors that instantly switch the video signal that is output according to the transition of the signal level of the first selection signal a1 and the second selection signal a2.

As shown in FIG. 5, in the conventional semiconductor device, when the signal level of the first selection signal a1 is changed, the output video signal is instantly switched. Accordingly, in the conventional semiconductor device, the first video signal SV1 is input into the display 200 at a timing not synchronized with the first vertical synchronization signal SS1. As a result, after the first video signal SV1 is input into the display 200, the video displayed on the display 200 tends to be distorted until the first video signal SV1 is synchronized with the first vertical synchronization signal SS1.

Further, in the conventional semiconductor device, the output video signal is switched before the frame period of the second video signal SV2 before the switching is terminated. Accordingly, the video before the switching may be partially missing on the display 200 immediately before the video signal is switched.

On the other hand, in the first embodiment, when the first selector 14 switches the video signal to be selected according to the first selection signal a1, the first selector 14 synchronizes the timing when the frame period of the second video signal SV2 that is the signal before the switching is terminated with the second vertical synchronization signal SS2 accompanied with the second video signal SV2. Further, the first selector 14 synchronizes the timing when the first selector 14 outputs the first video signal SV1 that is the signal after the switching with the first vertical synchronization signal SS1 accompanied with the first video signal SV1. As a result, it is possible to prevent the video displayed on the display 200 from being distorted due to the switching of the video signal. Further, it is possible to prevent the video before the switching from being partially missing on the display 200.

Second Embodiment

Figure 6:
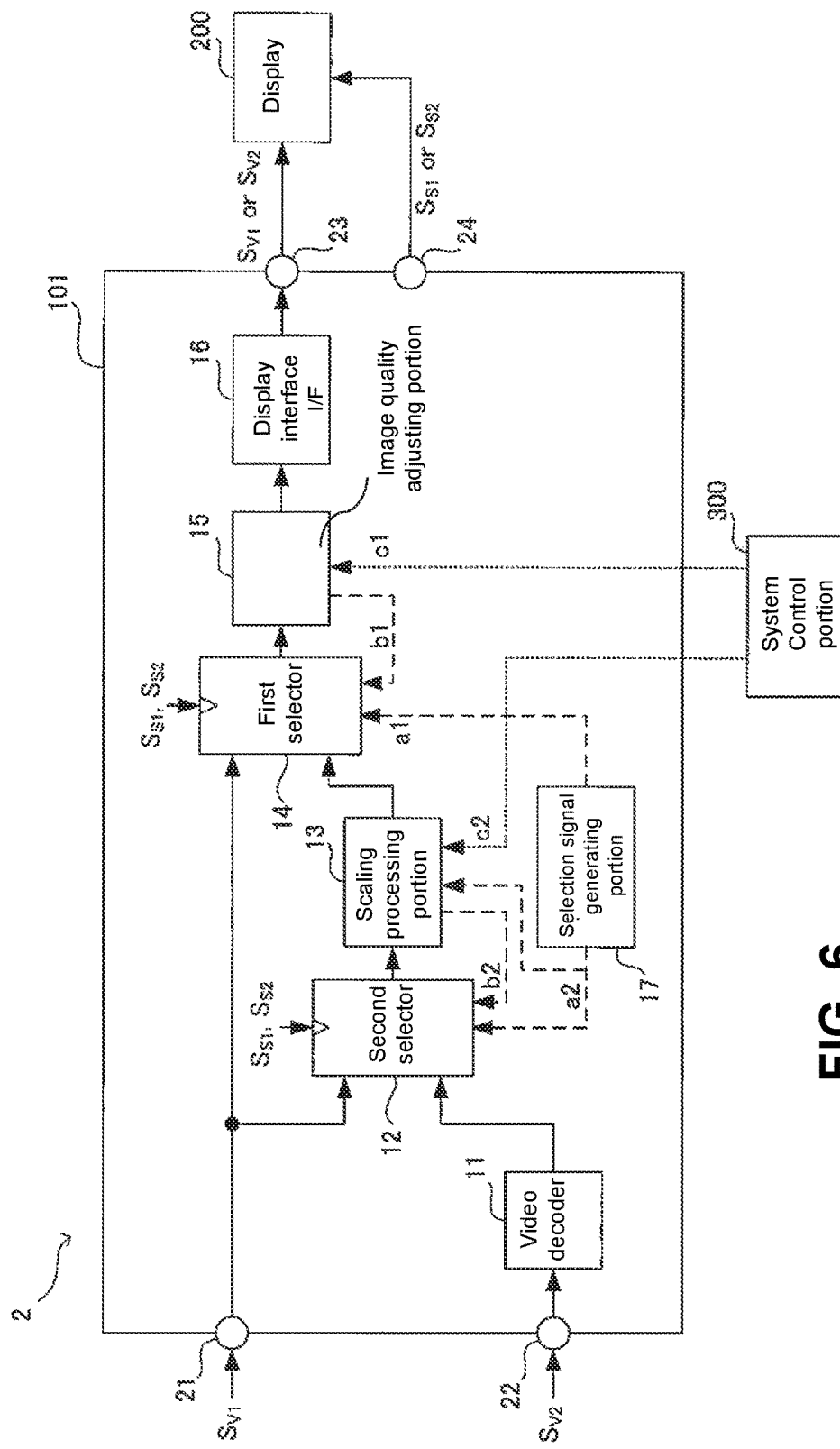
FIG. 6 is a block diagram showing a configuration of a video display system including a semiconductor device according to a second embodiment of the present invention.

A second embodiment of the present invention will be explained next. FIG. 6 is a block diagram showing a configuration of a video display system 2 including a semiconductor device 101 according to the second embodiment of the present invention.

As shown in FIG. 6, the semiconductor device 101 is configured to include the video decoder 11, the scaling processing portion 13, the image quality adjusting portion 15, the display interface 16, the selection signal generating portion 17, the first selector 14, the second selector 12, the video input terminals 21 and 22, the video output terminal 23, and the synchronization signal output terminal 24.

In the second embodiment, in the semiconductor device 101, the image quality adjusting portion 15 is configured to generate a first status signal b1 indicating that the image quality adjusting portion 15 is in the middle of changing the setting values while the image quality adjusting portion 15 is changing (rewriting) the setting values c1 to be stored in the registers 151*a* to 151*e* (refer to FIG. 3) when the output video signal is switched. Further, the image quality adjusting portion 15 is configured to supply the first status signal b1 to the first selector 14. After the image quality adjusting portion 15 changes (rewrites) the setting values c1 to be stored in the registers 151*a* to 151*e*, the image quality adjusting portion 15 validates the image quality adjustment according to the setting values newly set in the registers 151*a* to 151*e* in synchronization with the vertical synchronization signal accompanied with the video signal after the switching.

In the second embodiment, in the semiconductor device 101, the first selector 14 is configured to output the video signal selected according to the first status signal b1 in synchronization with the vertical synchronization signal accompanied with the video signal thus selected after the first selector 14 detects that the image quality adjusting portion 15 completes the image quality adjustment according to the first status signal b1 supplied from the image quality adjusting portion 15.

In the second embodiment, in the semiconductor device 101, the scaling processing portion 13 is configured to generate a second status signal b2 indicating that the scaling processing portion 13 is in the middle of changing the setting values while the scaling processing portion 13 is changing (rewriting) the setting values c2 stored in the registers 131*a* to 131*e* (refer to FIG. 2) when the output video signal is switched. Further, the scaling processing portion 13 is configured to supply the second status signal b2 to the second selector 12. After the scaling processing portion 13 changes (rewrites) the setting values c2 stored in the registers 131*a* to 131*e*, the scaling processing portion 13 validates the scaling process according to the setting values newly set in the registers 131*a* to 131*e* in synchronization with the vertical synchronization signal accompanied with the video signal after the switching.

In the second embodiment, in the semiconductor device 101, the second selector 12 is configured to output the video signal selected according to the second status signal b2 in synchronization with the vertical synchronization signal accompanied with the video signal thus selected after the second selector 12 detects that the scaling processing portion 13 completes the change in the setting values c2 according to the second status signal b2 supplied from the scaling processing portion 13.

Figure 7:
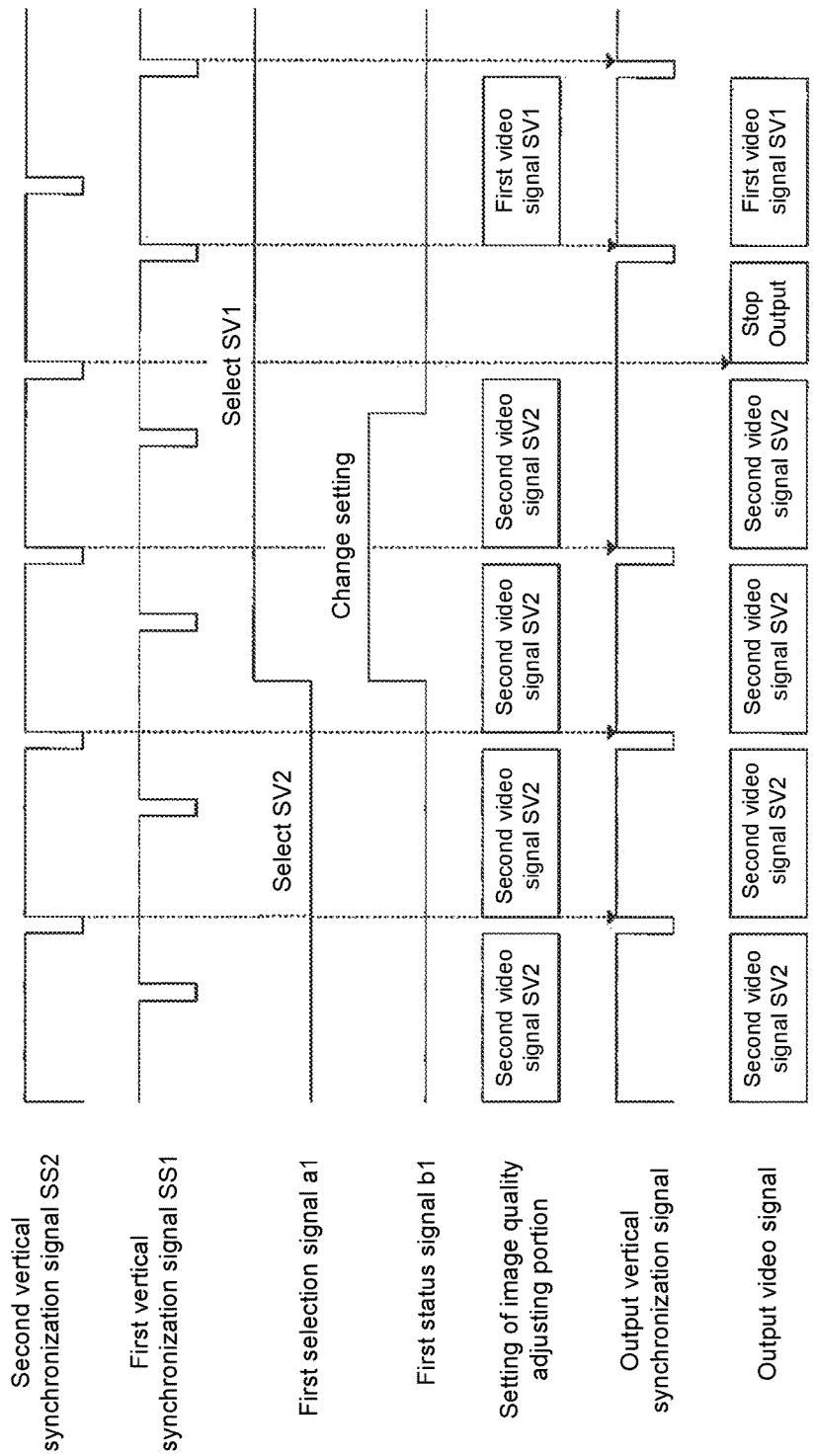
FIG. 7 is a time chart showing an example of an operation of the semiconductor device according to the second embodiment of the present invention.

An operation of the semiconductor device 101 will be explained next. FIG. 7 is a time chart showing an example of the operation of the semiconductor device 101 according to the second embodiment of the present invention. FIG. 7 shows time-base transition of the first vertical synchronization signal SS1, the second vertical synchronization signal SS2, the first selection signal a1, the first status signal b1, the setting of the image quality adjusting portion 15, the output vertical synchronization signal, and the output video signal. More specifically, FIG. 7 shows the example of the operation of the semiconductor device 101 when the output video signal is switched from the second video signal SV2 to the first video signal SV1.

In the second embodiment, when the image quality adjusting portion 15 detects that the signal level of the first selection signal a1 supplied from the selection signal generating portion 17 is changed, the image quality adjusting portion 15 changes the signal level of the first status signal b1 to the high level indicating that the image quality adjusting portion 15 is changing the setting. Afterward, the system control portion 300 supplies the setting values c1 corresponding to the first video signal SV1 after the switching to the image quality adjusting portion 15. Accordingly, the image quality adjusting portion 15 rewrites the setting values c1 to be stored in the registers 151*a* to 151*e* from the setting values corresponding to the second video signal SV2 before the switching to the setting values corresponding to the first video signal SV1 after the switching.

In the second embodiment, while the image quality adjusting portion 15 is rewriting the setting values to be stored in the registers 151*a* to 151*e*, the image quality adjusting portion 15 maintains the first status signal b1 at the high level. When the image quality adjusting portion 15 completes rewriting the setting values to be stored in the registers 151*a* to 151*e*, the image quality adjusting portion 15 changes the signal level of the first status signal b1 to the low level.

In the second embodiment, the first selector 14 continues to output the second video signal SV2 that is the signal before the switching until the frame period of the second video signal SV2 that is the signal before the switching is terminated, which occurs immediately after the first selector 14 detects that the image quality adjusting portion 15 completes changing the setting values to be stored in the registers 151*a* to 151*e* according to the first status signal b1

(that is, immediately after the signal level of the first status signal b1 is changed from the high level to the low level).

In the second embodiment, while the first selector 14 is outputting the second video signal SV2 before the switching, the image quality adjusting portion 15 maintains the image quality setting corresponding to the second video signal SV2 before the switching. After the image quality adjusting portion 15 completes changing the setting values c1 to be stored in the registers 151a to 151e, the image quality adjusting portion 15 validates the image quality adjustment according to the setting values c1 newly set in the registers 151a to 151e (that is, the image quality adjustment corresponding to the first video signal SV1 after the switching) in synchronization with the first vertical synchronization signal SS1 accompanied with the first video signal SV1 after the switching.

In the second embodiment, after the first selector 14 detects that the image quality adjusting portion 15 completes changing the setting values c1 to be stored in the registers 151a to 151e (that is, the image quality adjusting portion 15 changes the signal level of the first status signal b1 from the high level to the low level), the first selector 14 outputs the first video signal SV1 in synchronization with the first vertical synchronization signal SS1 accompanied with the first video signal SV1.

In the second embodiment, the first selector 14 stops outputting the video signal during a period of time from the timing when the first selector 14 stops outputting the second video signal SV2 that is the signal before the switching to the timing when the first selector 14 starts outputting the first video signal SV1 that is the signal after the switching. It should be noted that the image quality adjusting portion 15 processes the first video signal SV1 after the switching supplied from the first selector 14 after the image quality adjusting portion 15 completes the setting corresponding to the first video signal SV1 after the switching.

As described above, in the semiconductor device 101 in the second embodiment, when the image quality adjusting portion 15 completes changing the setting upon the video signal is switched, the first selector 14 outputs the video signal after the switching. Accordingly, it is possible to prevent for the first selector 14 from outputting the video signal after the switching before the image quality adjusting portion 15 completes changing the setting. If the first selector 14 outputs the video signal after the switching before the image quality adjusting portion 15 completes changing the setting, the image quality adjusting portion 15 may apply improper image quality adjustment on the video signal after the switching. In this case, it may be difficult to display the video according to the video signal after the switching with desired image quality.

As described above, in the semiconductor device 101 in the second embodiment, the image quality adjusting portion 15 applies the image quality corresponding to the video signal after the switching all the time to the video signal after the switching output from the first selector 14. Accordingly, it is possible to display the video according to the video signal after the switching with desired image quality.

Further, in the semiconductor device 101 in the second embodiment, similar to the semiconductor device 100 in the first embodiment, when the first selector 14 switches the video signal to be selected according to the first selection signal a1, the first selector 14 synchronizes the timing when the frame period of the second video signal SV2 that is the signal before the switching is terminated with the second vertical synchronization signal SS2 accompanied with the second video signal SV2. Further, the first selector 14 synchronizes the timing when the first selector 14 outputs the first video signal SV1 that is the signal after the switching with the first vertical synchronization signal SS1 accompanied with the first video signal SV1. Accordingly, it is possible to prevent the video displayed on the display 200 from being distorted, and prevent the video after the switching from being partially missing.

In the second embodiment, it should be noted that an operation of the scaling processing portion 13 is similar to that of the image quality adjusting portion 15, and an operation of the second selector 12 is similar to that of the first selector 14. More specifically, when the scaling processing portion 13 detects that the signal level of the second selection signal a2 supplied from the selection signal generating portion 17 is changed, the scaling processing portion 13 changes the signal level of the second status signal b2 to the high level indicating that the scaling processing portion 13 is changing the setting. Afterward, the system control portion 300 supplies the setting values c2 corresponding to the first video signal SV1 after the switching to the scaling processing portion 13. Accordingly, the scaling processing portion 13 rewrites the setting values c2 stored in the registers 131a to 131e from the setting values corresponding to the second video signal SV2 before the switching to the setting values corresponding to the first video signal SV1 after the switching.

In the second embodiment, while the scaling processing portion 13 is rewriting the setting values to be stored in the registers 131a to 131e, the scaling processing portion 13 maintains the second status signal b2 at the high level. When the scaling processing portion 13 completes rewriting the setting values to be stored in the registers 131a to 131e, the scaling processing portion 13 changes the signal level of the second status signal b2 to the low level.

In the second embodiment, the second selector 12 continues to output the second video signal SV2 that is the signal before the switching until the frame period of the second video signal SV2 that is the signal before the switching is terminated, which occurs immediately after the second selector 12 detects that the scaling processing portion 13 completes changing the setting values to be stored in the registers 131a to 131e according to the second status signal b2 (that is, immediately after the signal level of the second status signal b2 is changed from the high level to the low level).

In the second embodiment, while the second selector 12 is outputting the second video signal SV2 before the switching, the scaling processing portion 13 maintains the image quality setting corresponding to the second video signal SV2 before the switching. After the scaling processing portion 13 completes changing the setting values c2 to be stored in the registers 131a to 131e, the scaling processing portion 13 validates the scaling process according to the setting values c2 newly set in the registers 131a to 131e (that is, the scaling process corresponding to the first video signal SV1 after the switching) in synchronization with the first vertical synchronization signal SS1 accompanied with the first video signal SV1 after the switching.

In the second embodiment, after the second selector 12 detects that the scaling processing portion 13 completes changing the setting values c2 to be stored in the registers 131a to 131e (that is, the scaling processing portion 13 changes the signal level of the second status signal b2 from the high level to the low level), the second selector 12 outputs the first video signal SV1 in synchronization with the first vertical synchronization signal SS1 accompanied with the first video signal SV1. It should be noted that the scaling processing portion 13 processes the first video signal SV1 after the switching supplied from the second selector 12 after the scaling processing portion 13 completes the setting corresponding to the first video signal SV1 after the switching.

Third Embodiment

Figure 8:
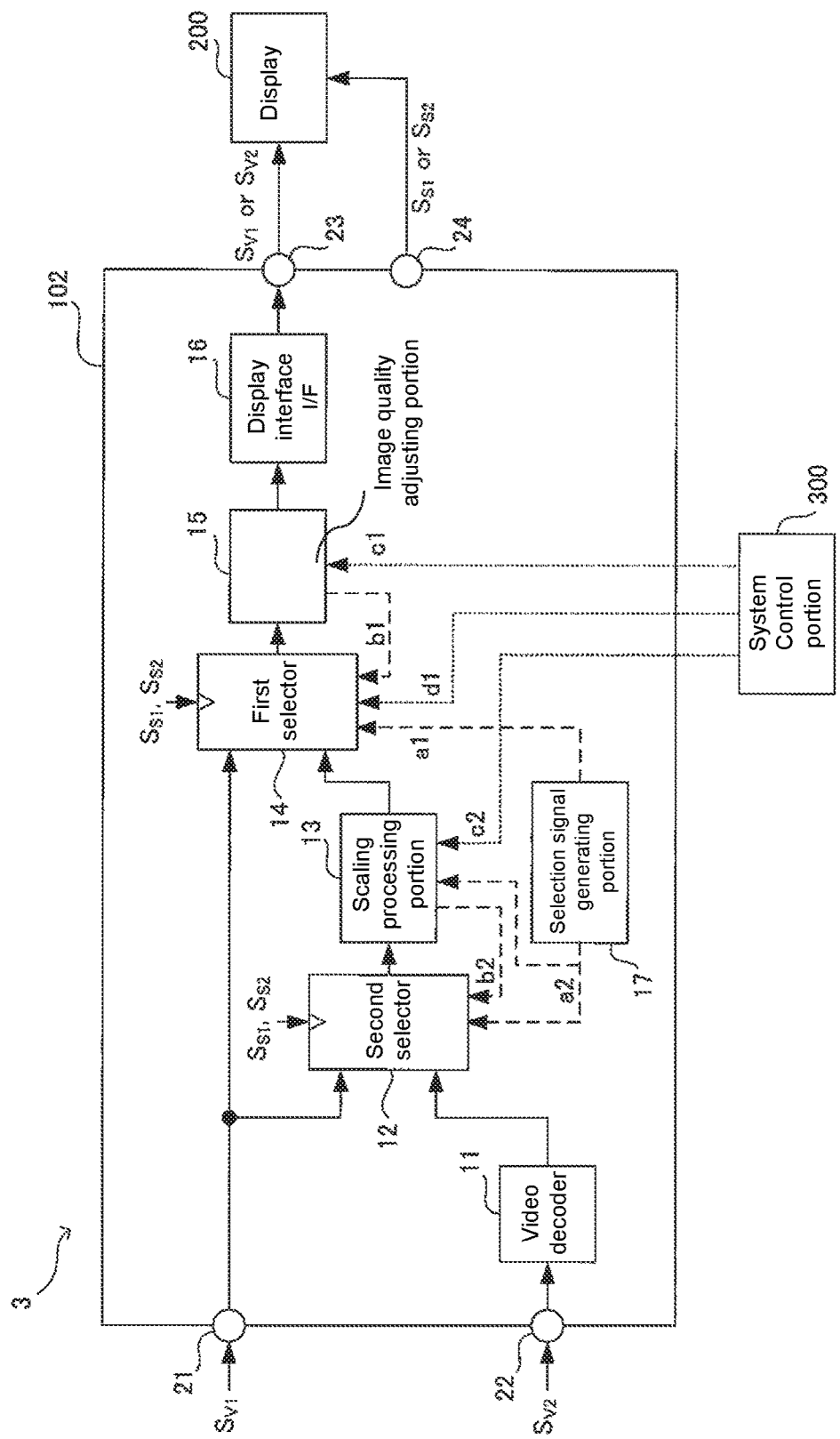
FIG. 8 is a block diagram showing a configuration of a video display system including a semiconductor device according to a third embodiment of the present invention.

A third embodiment of the present invention will be explained next. FIG. 8 is a block diagram showing a configuration of a video display system 3 including a semiconductor device 102 according to the third embodiment of the present invention.

In the third embodiment, similar to the second embodiment, in the semiconductor device 102, the image quality adjusting portion 15 is configured to generate the first status signal b1 indicating that the image quality adjusting portion 15 is in the middle of changing the setting values while the image quality adjusting portion 15 is changing (rewriting) the setting values c1 to be stored in the registers 151a to 151e (refer to FIG. 3) when the output video signal is switched. Further, the image quality adjusting portion 15 is configured to supply the first status signal b1 to the first selector 14. After the image quality adjusting portion 15 changes (rewrites) the setting values c1 to be stored in the registers 151a to 151e, the image quality adjusting portion 15 validates the image quality adjustment according to the setting values newly set in the registers 151a to 151e in synchronization with the vertical synchronization signal accompanied with the video signal after the switching.

In the third embodiment, in the semiconductor device 102, the first selector 14 is configured to switch between a first mode and a second mode. In the first mode, the first selector 14 outputs the video signal in synchronization with the vertical synchronization signal accompanied with the video signal after the switching after the first selector 14 detects that the image quality adjusting portion 15 completes changing the setting values according to the first status signal b1. In the second mode, the first selector 14 outputs the video signal thus selected in synchronization with the vertical synchronization signal accompanied with the video signal after the frame period of the video signal is terminated, which occurs immediately after the first selection signal a1 is switched. In particular, the first selector 14 is configured to select one of the first mode and the second mode according to the first status signal b1 supplied from the system control portion 300.

In the third embodiment, when the first selector 14 selects the first mode, the semiconductor device 102 performs an operation similar to that shown in FIG. 7 in the second embodiment. When the semiconductor device 102 performs the operation in the first mode, the image quality adjusting portion 15 completes changing the setting when the first selector 14 outputs the video signal after the switching. Accordingly, the image quality adjusting portion 15 properly performs the image quality adjustment on the video signal after the switching. However, in the first mode, if it takes a long time for the image quality adjusting portion 15 to change the setting, it takes also long time for the first selector 14 to output the video signal after the switching after the signal level of the first selection signal a1 is changed. In other words, it may be difficult to quickly display the video after the switching on the display 200.

Figure 9:
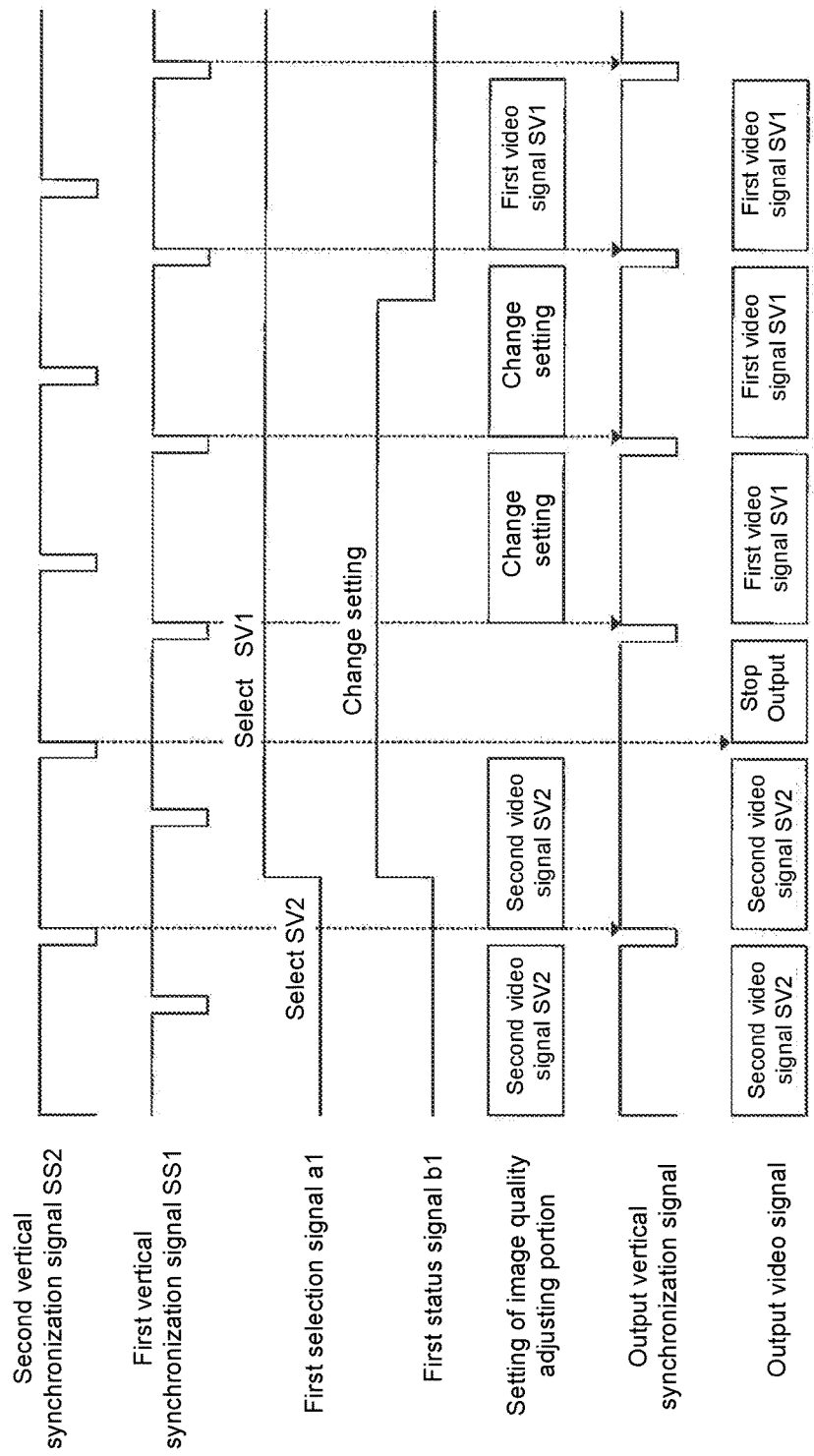
FIG. 9 is a time chart showing an example of an operation of the semiconductor device according to the third embodiment of the present invention.

FIG. 9 is a time chart showing an example of the operation of the semiconductor device 102 according to the third embodiment of the present invention. It should be noted that the semiconductor device 102 performs the operation shown in FIG. 9 when the first selector 14 selects the second mode. More specifically, FIG. 9 shows the example of the operation of the semiconductor device 102 when the output video signal is switched from the second video signal SV2 as the analog signal to the first video signal SV1 as the digital signal.

In the third embodiment, in the second mode, the first selector 14 stops outputting the second video signal SV2 before the switching when the frame period of the second video signal SV2 before the switching is terminated, which occurs immediately after the signal level of the first selection signal a1 is changed, regardless of whether the image quality adjusting portion 15 completes changing the setting. Afterward, the first selector 14 outputs the first video signal SV1 in synchronization with the first vertical synchronization signal SS1 accompanied with the first video signal SV1.

In the third embodiment, when the first selector 14 selects the second mode, as compared with the first mode, it is possible to shorten the period of time from the signal level of the first selection signal a1 is changed to when the video signal after the switching is output. Accordingly, it is possible to quickly display the video after the switching on the display 200.

In the third embodiment, when the first selector 14 selects the second mode, the image quality adjusting portion 15 may perform the image quality adjustment on the first video signal SV1 after the switching before the image quality adjusting portion 15 completes changing the setting as shown in FIG. 9. In this case, it is difficult to display the video after the switching with desired image quality on the display 200.

Figure 10:
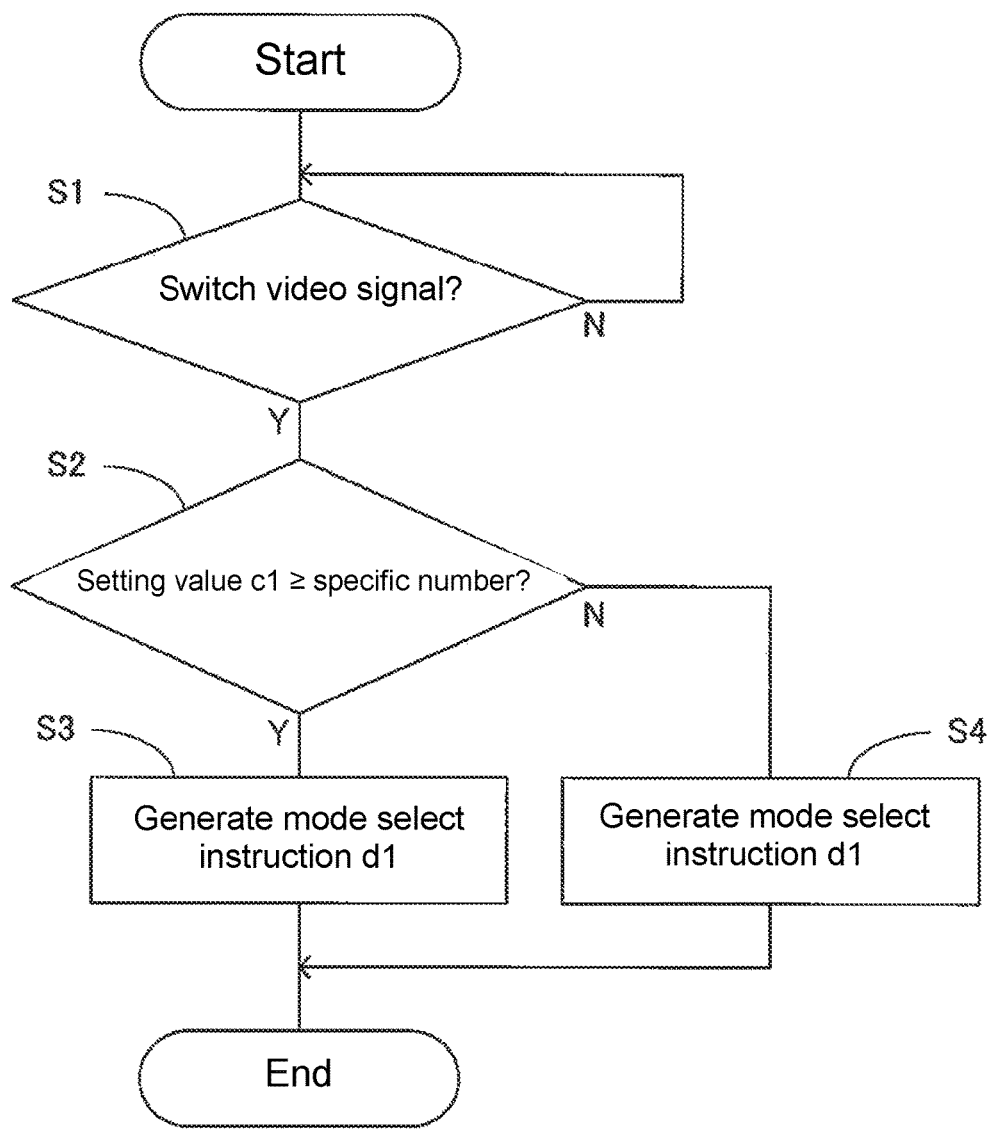
FIG. 10 is a flow chart showing an operation of a system control portion of the video display system when the system control portion generates a mode selection instruction according to the third embodiment of the present invention.

FIG. 10 is a flow chart showing an operation of the system control portion 300 of the video display system 3 when the system control portion 300 generates a mode selection instruction d1 according to the third embodiment of the present invention.

In step S1, the system control portion 300 determines whether there is a switching instruction for switching the video signal to be displayed on the display 200 according to an operational input on an operation portion (not shown) disposed in the video display system 3. When the system control portion 300 determines that there is the switching instruction for switching the video signal to be displayed on the display 200, the process proceeds to step S2.

In step S2, the system control portion 300 determines whether the number of the setting values c1 that the image quality adjusting portion 15 changes when the video signal is switched is greater than a specific number. For example, when the image quality adjusting portion 15 changes the setting values c1, the number of the setting values c1 to be changed increases with the number of the settings to be changed. Further, when the number of the setting values c1 that the image quality adjusting portion 15 changes increases, it takes a longer time for the image quality adjusting portion 15 to change the settings. It should be noted that the system control portion 300 is configured to specify the number of the setting values c1 that the image quality adjusting portion 15 changes according to the type of the video signal before the switching, the type of the video signal after the switching, and the likes.

When the system control portion 300 determines that the number of the setting values c1 that the image quality adjusting portion 15 changes is greater than the specific number, the process proceeds to step S3. When the system control portion 300 determines that the number of the setting values c1 that the image quality adjusting portion 15 changes is smaller than the specific number, the process proceeds to step S4.

In step S3, the system control portion 300 generates the mode selection instruction d1 for selecting the second mode. Then, the system control portion 300 supplies the mode selection instruction d1 to the first selector 14. When the first selector 14 receives the mode selection instruction d1, the first selector 14 performs the operation in the second mode.

In step S4, the system control portion 300 generates the mode selection instruction d1 for selecting the first mode. Then, the system control portion 300 supplies the mode selection instruction d1 to the first selector 14. When the first selector 14 receives the mode selection instruction d1, the first selector 14 performs the operation in the first mode.

As described above, in the third embodiment, when the number of the setting values c1 that the image quality adjusting portion 15 changes is greater than the specific number, the first selector 14 performs the operation in the second mode. Accordingly, even though the image quality adjusting portion 15 may not be able to properly perform the image quality adjustment on the video signal after the switching just after the video signal is changed, it is possible to prevent a significant delay in the switching timing of the video signal because the image quality adjusting portion 15 takes a long time to change the setting.

Further, in the third embodiment, when the number of the setting values c1 that the image quality adjusting portion 15 changes is smaller than the specific number, the first selector 14 performs the operation in the first mode. Accordingly, the image quality adjusting portion 15 is able to properly perform the image quality adjustment on the video signal after the switching just after the video signal is changed. Further, it does not take a long time for the image quality adjusting portion 15 to change the setting. Accordingly, it is possible to prevent a significant delay in the switching timing of the video signal.

In the third embodiment, the operation mode of the first selector 14 is determined according to the number of the setting values c1 that the image quality adjusting portion 15 changes. It should be noted that the present invention is not limited thereto. Alternatively, for example, the operation mode of the first selector 14 may be determined according to an amount of data to be set. More specifically, when an amount of data to be set is smaller than a threshold value, the first mode is selected. Further, it may be configured to store a period of time necessary for the image quality adjusting portion 15 to change the setting in a previous operation. Then, the operation mode of the first selector 14 may be determined according to whether the period of time exceeds a threshold value.

In the first to third embodiments, two types of video signals, i.e., the first video signal SV1 and the second video signal SV2, are input into the video display system 1, the video display system 2, and the video display system 3. Alternatively, more than three video signals may be input into the video display system 1, the video display system 2, and the video display system 3. In this case, the first selector 14 and the second selector 12 are configured to select one of more than three video signals.

In the first to third embodiments, it should be noted that the semiconductor device 100, the semiconductor device 101, and the semiconductor device 102 are examples of the semiconductor device according to the present invention. Further, the first selector 14 is an example of a first selecting portion according to the present invention, and the second selector 12 is an example of a second selecting portion according to the present invention. Further, the selection signal generating portion 17 is an example of a selection signal generating portion according to the present invention.

Further, the image quality adjusting portion 15 is an example of an image quality adjusting portion according to the present invention. Further, the registers 151a to 151e are an example of a first setting portion according to the present invention.

In the first to third embodiments, it should be noted that the scaling processing portion 13 is an example of a scaling processing portion according to the present invention. Further, the registers 131a to 131e are an example of a second setting portion according to the present invention. Further, the video display system 1, the video display system 2, and the video display system 3 are examples of the video display system according to the present invention. Further, the display 200 is an example of a display according to the present invention. Further, the system control portion 300 is an example of a control portion according to the present invention.

The disclosure of Japanese Patent Application No. 2015-212066, filed on Oct. 28, 2015, is incorporated in the application by reference.

While the invention has been explained with reference to the specific embodiments of the invention, the explanation is illustrative and the invention is limited only by the appended claims.

What is claimed is:
1. A semiconductor device comprising:
a first selecting processor configured to select one of a first video signal and a second video signal according to a first selection signal;
a selection signal generating processor configured to generate the first selection signal;
a second selecting processor configured to select another one of the first video signal and the second video signal according to a second selection signal; and
a scaling processor configured to scale a size of a video of the another one of the first video signal and the second video signal to a size of a display device,
wherein said first selecting processor is configured to output the one of the first video signal and the second video signal in synchronization with a synchronization signal accompanied with the one of the first video signal and the second video signal,
said second selecting processor is configured to output the another one of the first video signal and the second video signal in synchronization with a synchronization signal accompanied with the another one of the first video signal and the second video signal to the scaling processor,
said scaling processor is configured to output the another one of the first video signal and the second video signal to the first selecting processor, said scaling processor includes a second setting processor configured to store a setting value for the scaling processor to scale the video, said scaling processor is configured to supply a second status signal indicating that the scaling processor changes the setting value to the second selecting processor when the scaling processor changes the setting value to be stored in the second setting processor, and
said second selecting processor is configured to output the another one of the first video signal and the second video signal in synchronization with the synchronization signal accompanied with the another one of the first video signal and the second video signal after the second selecting processor detects that the scaling processor completes changing the setting value to be stored in the second setting processor according to the second status signal.

2. The semiconductor device according to claim 1, wherein said first selecting processor is configured to switch the first video signal to the second video signal according to a change in a signal level of the first selection signal, said first selecting processor is configured to continue to output the first video signal until a frame period of the first video signal is terminated, and said first selecting processor is configured to output the second video signal in synchronization with the synchronization signal accompanied with the second video signal after the frame period of the first video signal is terminated.

3. The semiconductor device according to claim 1, wherein said first selecting processor is configured to stop outputting the first video signal immediately after the frame period of the first video signal is terminated.

4. The semiconductor device according to claim 1, wherein said first selecting processor is configured to output the one of the first video signal and the second video signal to an outside of the semiconductor device in synchronization with the synchronization signal accompanied with the one of the first video signal and the second video signal.

5. A video display system, comprising:
said semiconductor device according to claim 1; and
a display device configured to display the video of the one of the first video signal and the second video signal selected with the first selecting processor.

6. The semiconductor device according to claim 1, further comprising an image quality adjusting processor configured to adjust image quality of a video including contrast adjustment, off-set adjustment, and gamma correction according to the one of the first video signal and the second video signal output from the first selecting processor.

7. The semiconductor device according to claim 6, wherein said image quality adjusting processor includes a first setting processor configured to store a setting value for the image quality adjusting processor to adjust the image quality of the video, and said image quality adjusting processor is configured to supply a first status signal indicating that the image quality adjusting processor changes the setting value to the first selecting processor when the image quality adjusting processor changes the setting value to be stored in the first setting processor.

8. The semiconductor device according to claim 6, wherein said first selecting processor is configured to output the one of the first video signal and the second video signal in synchronization with the synchronization signal accompanied with the one of the first video signal and the second video signal after the first selecting processor detects that the image quality adjusting processor completes changing the setting value to be stored in the first setting processor according to the first status signal.

9. The semiconductor device according to claim 7, wherein said first selecting processor is configured to switch an operation mode between a first mode and a second mode, said first selecting processor is configured to output the one of the first video signal and the second video signal in synchronization with the synchronization signal accompanied with the one of the first video signal and the second video signal in the first mode after the first selecting processor detects that the image quality adjusting processor completes changing the setting value to be stored in the first setting processor according to the first status signal, and said first selecting processor is configured to output the one of the first video signal and the second video signal in synchronization with the synchronization signal accompanied with the one of the first video signal and the second video signal in the first mode after the frame period of the first video signal is terminated.

10. A video display system, comprising:
said semiconductor device according to claim 7;
a display device configured to display the video of the one of the first video signal and the second video signal selected with the first selecting processor; and
a control processor configured to supply the setting value to the image quality adjusting processor for the image quality adjusting processor to adjust the image quality of the video.

11. A video display system, comprising:
said semiconductor device according to claim 9;
a display device configured to display the video of the one of the first video signal and the second video signal selected with the first selecting processor; and
a control processor configured to supply the setting value to the image quality adjusting processor for the image quality adjusting processor to adjust the image quality of the video,
wherein said control processor is configured to generate a first selection instruction to the first selecting processor to select the first mode when a number of the setting value is smaller than a specific number, and
said control processor is configured to generate a second selection instruction to the first selecting processor to select the second mode when a number of the setting value is greater than the specific number.

12. A method of outputting a video signal comprising the steps of:
generating a first selection signal;
selecting one of a first video signal and a second video signal to be input to a first selecting processor according to the first selection signal;
outputting the one of the in synchronization with a synchronization signal accompanied with the one of the first video signal and the second video signal;
selecting another one of the first video signal and the second video signal by a second selecting processor according to a second selection signal;
outputting the another one of the first video signal and the second video signal in synchronization with a synchronization signal accompanied with the another one of the first video signal and the second video signal to a scaling processor;
scaling a size of a video of the another one of the first video signal and the second video signal to a size of a display device by the scaling processor and outputting the another one of the first video signal and the second video signal to the first selecting processor;
storing a setting value to scale the video;
supplying a second status signal indicating that the setting value has been changed; and
the another one of the first video signal and the second video signal is output in synchronization with the synchronization signal accompanied with the another one of the first video signal and the second video signal after detecting changing the setting value to be stored according to the second status signal is completed.

* * * * *